United States Patent
Normand et al.

(10) Patent No.: US 7,857,258 B2
(45) Date of Patent: Dec. 28, 2010

(54) ASSEMBLY OF PANELS OF AN AIRPLANE FUSELAGE

(75) Inventors: Mathieu Normand, Toulouse (FR);
Marc Cazzola, Tournefeuille (FR);
Sandrine Deilhes, Toulouse (FR)

(73) Assignee: Airbus France, Toulouse (FR)

( * ) Notice: Subject to any disclaimer, the term of this patent is extended or adjusted under 35 U.S.C. 154(b) by 465 days.

(21) Appl. No.: 12/108,642

(22) Filed: Apr. 24, 2008

(65) Prior Publication Data

US 2009/0020646 A1  Jan. 22, 2009

(51) Int. Cl.
*B64C 1/00* (2006.01)
(52) U.S. Cl. .................. 244/120; 244/119; 244/131; 105/401
(58) Field of Classification Search ............ 244/120, 244/119, 131, 132; 105/401, 409
See application file for complete search history.

(56) References Cited

U.S. PATENT DOCUMENTS

| | | | | |
|---|---|---|---|---|
| 2,387,219 A | * | 10/1945 | Wallis | 244/117 R |
| 4,456,206 A | * | 6/1984 | Tijssen | 244/118.5 |
| 4,507,011 A | | 3/1985 | Brown | |
| 4,888,451 A | | 12/1989 | Toni et al. | |
| 5,518,208 A | * | 5/1996 | Roseburg | 244/132 |
| 5,806,797 A | * | 9/1998 | Micale | 244/120 |
| 6,098,928 A | * | 8/2000 | Bross et al. | 244/131 |
| 2005/0082431 A1 | * | 4/2005 | Scown et al. | 244/119 |
| 2005/0213278 A1 | | 9/2005 | Hawley | |
| 2008/0210819 A1 | * | 9/2008 | Jarsaillon et al. | 244/120 |

FOREIGN PATENT DOCUMENTS

EP  1541464 A  6/2005

* cited by examiner

*Primary Examiner*—Christopher P Ellis
(74) *Attorney, Agent, or Firm*—Perman & Green LLP

(57) ABSTRACT

An aircraft fuselage including at least two sections kept assembled at a circumferential join, each section having at least one panel. The circumferential join includes at least one inner ring, situated on one face, called the inner face, of the fuselage. The inner ring has a width $l_i$, partially overlaps each of the two panels and is fixed to the two panels by fasteners. The fuselage also includes an outer ring, situated on one face, called the outer face, of the fuselage, opposite to the inner face. The outer ring has a width $l_e$, partially overlaps the two panels, and is fixed to the two panels and to the inner ring by some or all of the fasteners fixing the inner ring to the two panels.

7 Claims, 2 Drawing Sheets

ASSEMBLY OF PANELS OF AN AIRPLANE FUSELAGE

BACKGROUND

1. Field

The disclosed embodiments relate to the field of the assembly of an aircraft fuselage. More particularly, the disclosed embodiments relate to the assembly of panels of an aircraft fuselage when the forces to be transmitted between the fuselage panels are high.

2. Brief Description of Related Developments

An aircraft fuselage is a structure usually comprising substantially cylindrical sections butted against one another along join lines, called circumferential joins, defining planes perpendicular to the longitudinal axis of the fuselage, the sections themselves usually each consisting of several panels also assembled together along join lines, called longitudinal joins, oriented substantially along generatrixes of said fuselage.

These two types of joins are zones of weakness of the fuselage that must be made to withstand the heavy stresses to which the fuselage is subjected in flight.

Usually, the longitudinal joins of the fuselage are made by overlapping the ends of the two panels to be assembled, because the extra thickness linked to the outer panel, being in the direction of aerodynamic flow of the fuselage, does not generate any penalty on the performance of the aircraft.

On the other hand, at a circumferential join, an overlap of two panels would generate an unacceptable aerodynamic discontinuity, which justifies end-to-end assembly.

Therefore, to assemble two panels $2a$, $2b$, together end-to-end, it is known practice in the prior art, as illustrated in FIG. 1, to add, inside the fuselage and at a circumferential join 8, a reinforcing element, called a ring 3, having the shape of a plate partially overlapping the ends $22a$, $22b$ of the two panels $2a$, $2b$ situated facing one another at the join 8, in order to allow the transmission of the forces to be continuous between said two panels. One face 31 of said ring rests on inner faces $21a$, $21b$ of the panels $2a$, $2b$, and the ring 3 is assembled and fixed to said two panels by means of fasteners 7, such as rivets, preferably with a flat head to maintain a surface state taking account of the aerodynamic stresses of the aircraft.

To increase the strength of the fuselage, while retaining a reasonable weight, the panels are also reinforced, inside the fuselage, by reinforcing elements, in particular by frames 4, essentially positioned along sections of the fuselage substantially perpendicular to the longitudinal axis of the fuselage. Often, a reinforcing frame is placed on a face 32 of said ring opposite the face 31 in contact with the ends $22a$, $22b$ of the panels $2a$, $2b$ in order to reinforce the fuselage. Said frame is then fixedly attached to the ring 3 and to each panel $2a$, $2b$ with the aid of the fasteners 7.

When the forces, having to be transmitted between the two panels of the fuselage by said ring, increase, in particular because of the increased dimensions and capacities of an existing aircraft, such as for example a lengthening of the fuselage, then the use of said ring to produce the assembly between said two panels is not satisfactory.

Specifically, the ratio between the fatigue dimensioning of the join and its static dimensioning, which determines a reserve factor, reduces when the loads in the join increase.

This reduction of the reserve factor results in the virtually inevitable and rapid appearance, in service, of fatigue cracks under alternating stress. This high risk of the rapid appearance of cracks will reduce the inspection interval. In addition, because of the complex architecture (number and stacking of parts) of the zone concerned, these cracks are very difficult to detect and the inspections will consequently be even more difficult to carry out, which may cause the first inspection to be brought forward, and then the inspection intervals to be shortened.

A known solution consists in increasing the thickness of the ring to increase the ability of the join to transmit the forces between the two panels. However, the thickening of the ring does not significantly and proportionally improve the reserve factor, the reserve factor still remaining low, in particular because of the not inconsiderable increase in the secondary bending moment in the join, a consequence of the thickening of the ring.

The level of forces that it is now likely to encounter in heavily loaded joins can therefore no longer be transmitted by an assembly of the type used in the prior art, as shown in FIG. 1, which works in a simple shearing manner.

The use of a new assembly of panels making it possible to withstand ever-increasing loads is important, while ensuring a satisfactory reserve factor.

SUMMARY

The disclosed embodiments relate to an aircraft fuselage comprising at least two sections kept assembled at a circumferential join, each section comprising at least one panel, substantially with a thickness $e_p$, said circumferential join comprising at least one inner ring situated on one face, called the inner face, of the fuselage, said inner ring having a width $l_i$ and partially overlapping each of said two panels, said inner ring being fixed to said two panels by fasteners.

According to the disclosed embodiments, the fuselage also comprises an outer ring situated on one face, called the outer face, of the fuselage, opposite the inner face, said outer ring having a width $l_e$ and partially overlapping the two panels, said outer ring being fixed to said two panels and to the inner ring by some or all of the fasteners fastening the inner ring to said two panels.

In one embodiment, the width $l_i$ of the outer ring is substantially equal to the width $l_e$ of the inner ring, so that all the fasteners hold said two rings on the two fuselage panels.

In another embodiment, the width $l_i$ of the outer ring is smaller than the width $l_e$ of the inner ring.

Advantageously, in order to limit the penalty that the aerodynamic flow disturbance represents on the fuselage of the aircraft, the outer ring is thinner than the inner ring.

Preferably, in order to further reduce the protruding portion of the outer ring and improve the aerodynamics of the aircraft fuselage, each panel comprises, substantially symmetrically on either side of the circumferential join, a face offset in depth relative to the outer face in the thickness of the panel, the outer ring being positioned wholly or partly on the two offset faces.

The offset faces are made for example by means of a dimpling or rebate of the panels.

In one embodiment of the disclosed embodiments, the material forming the outer ring is different from that forming the inner ring.

In one embodiment of the disclosed embodiments, the material forming the outer ring is made of composite material.

BRIEF DESCRIPTION OF THE DRAWINGS

The detailed description of the disclosed embodiments is made with reference to the figures which represent.

DETAILED DESCRIPTION

Figure 1:
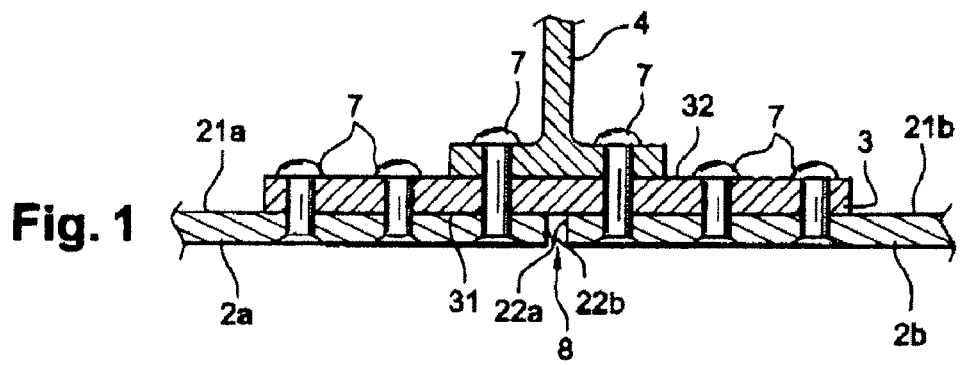
FIG. 1, already cited, a section of two panels assembled by means of an inner ring according to the prior art, FIG. 2, a schematic view of a portion of an aircraft fuselage, FIG. 3, a section of two panels assembled by means of an outer ring according to the disclosed embodiments, FIG. 4, a section of two panels assembled by means of an outer ring of substantially constant thickness according to an exemplary embodiment of the disclosed embodiments, FIG. 5, a section of two panels assembled by means of an outer ring of substantially constant thickness according to another exemplary embodiment of the disclosed embodiments, FIG. 6, a section of two panels assembled by means of an outer ring of variable thickness.
Figure 2:
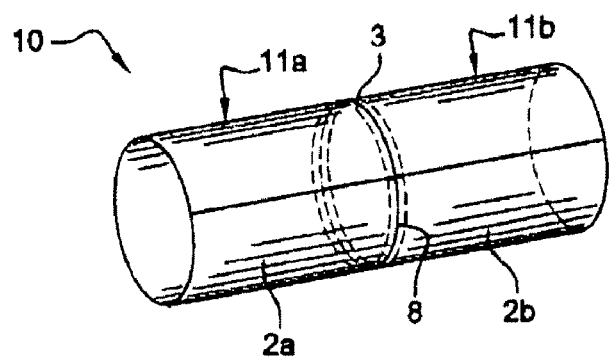

An aircraft fuselage 10, as schematized in FIG. 2, is made by the assembly of at least two sections 11a, 11b, at a circumferential join 8. Each section is made with at least one panel 2a, 2b, for example of a metallic material or of a composite material. At the circumferential join 8, the panels 2a, 2b, with a thickness $e_p$, are assembled together by a ring 3, situated on the inside of the fuselage, called the inner ring.

The exemplary embodiment of the disclosed embodiments is described in the case of an assembly of two panels at a circumferential join, in an embodiment to suit the case of a contact zone with an aerodynamic flow, the direction of said flow being substantially perpendicular to the circumferential join in the zone in question. The disclosed embodiments may be applied to any assembly of panels apart from a circumferential join, such as for example, although of less value, at a longitudinal join, said longitudinal join corresponding to a generatrix of the fuselage.

The inner ring 3 essentially comprises a plate positioned so as to overlap the ends 22a, 22b of the two panels 2a, 2b to be assembled. Said ring has a curvilinear length in the direction of the circumferential join 8, a width $l_i$ substantially perpendicular to the direction of the join, the length and the width determining a plane of the plate, and a thickness $e_i$, substantially constant and small relative to the width and the length of said plate. The thickness $e_i$ of the inner ring 3 is the result of static dimensioning and fatigue dimensioning computations which take account of the material used to produce the ring.

Figure 3:
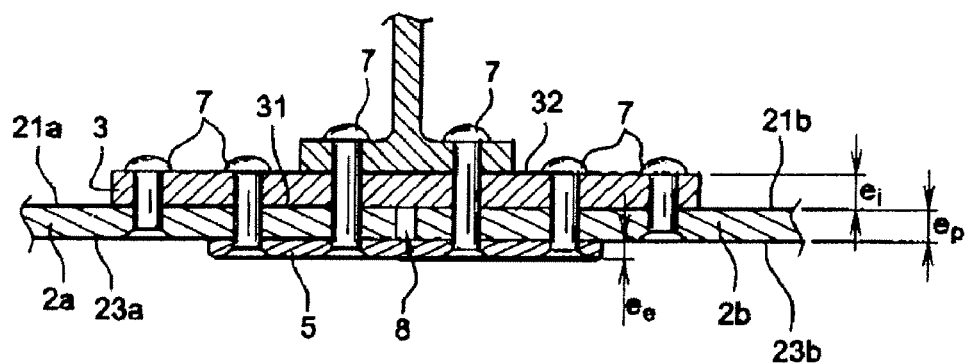

The inner ring 3 comprises a face 31 resting on inner faces 21a, 21b of the panels 2a, 2b at the ends 22a, 22b of said two panels, as illustrated in FIG. 3.

The inner ring 3 extends, in its width, over a length of each panel 2a, 2b in order to be able to be fixed to each panel and transmit the forces between said two panels, by a sufficient number of fasteners 7, usually distributed over several lines parallel with one another at the circumferential join 8.

In order to increase the capacity of the structure to transmit forces between the two panels, the join also comprises a ring 5 on the outside of the fuselage, called the outer ring, at the circumferential join 8.

The outer ring 5 essentially comprises a plate positioned so as to overlap the ends 22a, 22b of the two panels 2a, 2b to be assembled. Said ring has a curvilinear length in the direction of the circumferential join 8, a width $l_e$ substantially perpendicular to the direction of the join, the length and the width determining a plane of the plate, and a thickness $e_e$, substantially constant and small relative to the width of and the length of said plate.

Said outer ring is positioned on outer faces 23a, 23b, usually in contact with the aerodynamic flow around the fuselage, opposite the inner faces 21a, 21b of the panels 2a, 2b, facing the inner ring 3. A face 51 of the outer ring 5 rests on the ends 22a, 22b of said two panels.

As for the inner ring 3, the outer ring 5 extends in its width over a length of each panel 2a, 2b, in order to be able to be fixed to each panel and transmit the forces between said two panels.

Preferably, to improve the aerodynamic flow on the aircraft fuselage, the outer ring 5 also has progressively thinner zones, for example a bevel 35, on ridges of a face 52, opposite to the face 51 fixed to the two panels 2a, 2b.

The outer ring 5 is held on the two panels 2a, 2b by means of fasteners 7, such as rivets, preferably with flat head at the outer ring 5, in order to maintain a surface state taking account of the aerodynamic stresses of the aircraft. Preferably, said outer ring is held on said two panels by the same fasteners 7 holding the inner ring 3 on said two panels.

In an embodiment not shown, the inner ring 3 and the outer ring 5 have substantially identical widths $l_e$ and $l_i$ and extend similarly over the two panels 2a, 2b so that all the fasteners 7 hold the inner ring 3 and the outer ring 5 on said two panels.

Therefore, the forces at the circumferential join 8 are transmitted partly into the inner ring 3 and partly into the outer ring 5, said two rings being situated on either side of a neutral fiber of each panel 2a, 2b. In this type of assembly, the forces are transmitted into the joins which work in a double shearing manner. The distribution of the loads therefore makes it possible to limit the bending moment in the join which has the effect of improving the reserve factor.

In an embodiment of the disclosed embodiments, as illustrated in FIG. 3, in order to limit the penalty that the aerodynamic flow disturbance on the fuselage of the aircraft represents by adding a protruding outer ring 5, the outer ring 5 is advantageously narrower and thinner than the inner ring 3.

Although the forces between the two rings 3, 5 are dissymmetrical in this embodiment, a portion of the flow of the forces is nevertheless transmitted into the outer ring 5, and therefore makes it possible to obtain a reserve factor that is improved relative to a single inner ring 3.

Preferably, the thickness $e_e$ of the outer ring 5 is advantageously reduced to a minimum acceptable level that is determined based on a desired minimum reserve factor value.

Figure 4:
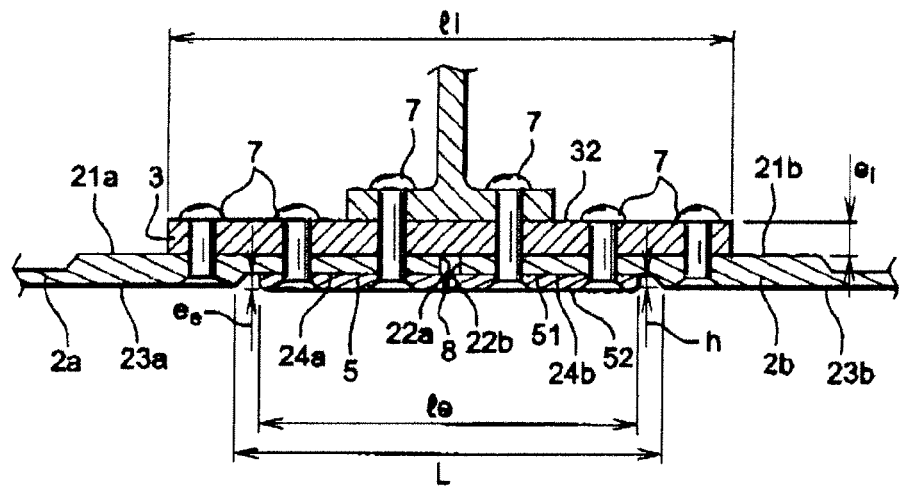

In an enhanced embodiment of the disclosed embodiments, in order to make the surface of the fuselage practically continuous facing the aerodynamic flow, the outer ring 5, preferably of minimum thickness, is positioned, at least partly, on faces 24a, 24b that are offset in depth relative to the outer faces 23a, 23b by a height h in the depth $e_p$ of the panels 2a, 2b, at the ends 22a, 22b situated on the side of the circumferential join 8, as illustrated in FIG. 4. Preferably, after the two panels 2a, 2b have been juxtaposed at the circumferential join 8, said panels 2a, 2b are substantially symmetrical at said circumferential join.

The thickness h of the offset face 24a, respectively 24b, is preferably at most equal to the thickness $e_e$ of the outer ring 5.

The offset faces 24a, 24b have a total width L that is substantially greater than the width $l_e$ of the outer ring, so as to allow the positioning of the outer ring 5 on said offset faces.

In one embodiment, as shown in FIG. 4, the offset face 24a, respectively 24b, is made by means of a rebate of the composite panel 2a, respectively 2b, at the end 22a, respectively 22b.

Preferably, to compensate for the loss of material from the panels 2a, 2b, due to the rebates at the circumferential join 8, and so that the stresses in the material of the panels 2a, 2b, after the rebate has been made, remain within the acceptable structural limits, the panels 2a, 2b comprise an extra thickness at the circumferential join 8 over a length that is substantially greater than the width L of the rebates.

Figure 5:
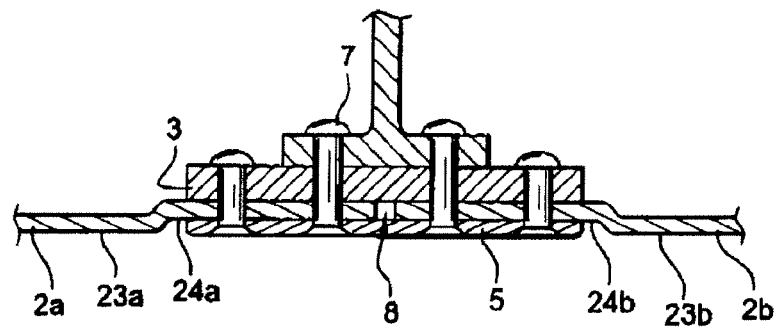

In another exemplary embodiment, as shown in FIG. 5, the offset face 24a, respectively 24b, is made by means of a dimpling of the composite panel 2a, respectively 2b, at the end 22a, respectively 22b.

In one embodiment of the disclosed embodiments, the inner ring 3 and the outer ring 5 are made of the same material, for example, of an aluminum-based alloy.

In another embodiment of the disclosed embodiments, the outer ring 5 is made of a material different from that of the inner ring 3. In the zones of the fuselage in which it is necessary to take account of the aerodynamics of the aircraft fuselage, it is advantageous to produce an outer ring 5 that is as thin as possible and of substantially constant thickness. It is therefore particularly worthwhile to produce it with suitable materials such as, for example, a composite material, which is a material based on carbon or other fibers impregnated with resin, or a laminated composite material comprising a layering of metal sheets and sheets made of a fiber-based composite material, also known by the name of Glare®.

Figure 6:
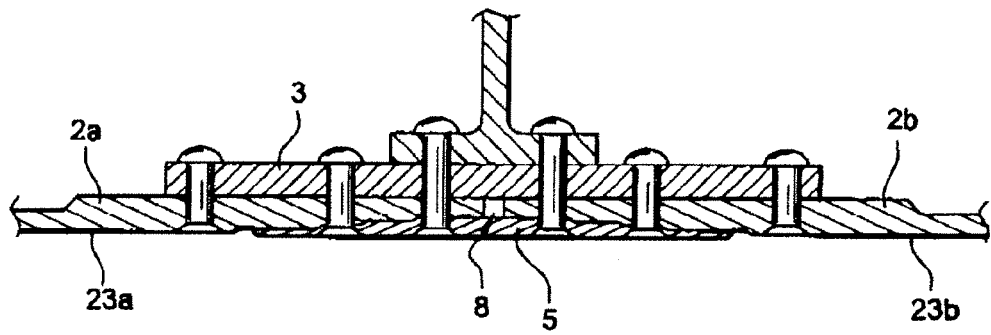

The disclosed embodiments are not limited to the examples of an outer ring 5 with a substantially constant thickness. Those skilled in the art are capable of adapting the disclosed embodiments to an outer ring 5 of variable thickness, such as for example in the case of a composite panel rebate as illustrated in FIG. 6.

The disclosed embodiments therefore make it possible to obtain an assembly of panels at a join of an aircraft fuselage by means of an inner ring and an outer ring making it possible to increase the capacity of the join to transmit the forces between two panels, both in a static manner and in ageing under alternating stresses.

The invention claimed is:

1. Aircraft fuselage, comprising at least two sections kept assembled at a circumferential join, each section comprising at least one panel, substantially with a thickness $e_p$, said circumferential join comprising at least one inner ring situated on one face, called the inner face, of the fuselage, said inner ring having a width $l_i$ and partially overlapping each of said two panels, said inner ring being fixed to said two panels by fasteners, characterized in that the fuselage comprises an outer ring situated on one face, called the outer face, of the fuselage, opposite the inner face, said outer ring having a width $l_e$ smaller than the width $l_i$ of the inner ring, and partially overlapping the two panels, said outer ring being fixed to said two panels and to the inner ring by only a portion of the fasteners fastening the inner ring to said two panels.

2. Aircraft fuselage according to claim 1 wherein the outer ring is thinner than the inner ring.

3. Aircraft fuselage according to claim 1 wherein each panel comprises, substantially symmetrically on either side of the circumferential join, a face offset in depth relative to the outer face in the thickness $e_p$ of the panel, the outer ring being positioned wholly or partly on the two offset faces.

4. Aircraft fuselage according to claim 3, in which the material forming the two panels is made of composite material and in that the offset faces are made by means of a dimpling of said two panels.

5. Aircraft fuselage according to claim 3, in which the material forming the two panels is made of a composite material and in that the offset faces are made by means of a rebate of said two panels.

6. Aircraft fuselage according to claim 1, in which the material forming the outer ring is different from that forming the inner ring.

7. Aircraft fuselage according to claim 1, in which the material forming the outer ring is made of composite material.

* * * * *

UNITED STATES PATENT AND TRADEMARK OFFICE
CERTIFICATE OF CORRECTION

PATENT NO.         : 7,857,258 B2                                          Page 1 of 1
APPLICATION NO.    : 12/108642
DATED              : December 28, 2010
INVENTOR(S)        : Normand et al.

It is certified that error appears in the above-identified patent and that said Letters Patent is hereby corrected as shown below:

Title Page, Col. 1, Below "(65) Prior Publication Data", insert -- (30) Foreign Application Priority Data Apr. 25, 2007 (FR) 2007-54678 --.

Signed and Sealed this
Seventeenth Day of May, 2011

David J. Kappos
*Director of the United States Patent and Trademark Office*